United States Patent
King et al.

(10) Patent No.: US 6,687,032 B1
(45) Date of Patent: Feb. 3, 2004

(54) OPTICAL EQUALIZER

(75) Inventors: Jonathan Paul King, Epping (GB); Simon Paul Parry, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/267,437

(22) Filed: Mar. 12, 1999

(65) Prior Publication Data

(30) Foreign Application Priority Data

Dec. 15, 1998 (GB) ............................................. 9827602

(51) Int. Cl.[7] ............................................. H04B 10/00
(52) U.S. Cl. ........................ 359/161; 359/124; 359/179
(58) Field of Search ........................... 385/15, 39, 27, 385/24; 359/124, 161, 187, 182, 179

(56) References Cited

U.S. PATENT DOCUMENTS

| | | | | |
|---|---|---|---|---|
| 5,321,543 A | * | 6/1994 | Huber | 359/187 |
| 5,333,219 A | * | 7/1994 | Kuznetsov | 385/45 |
| 5,513,029 A | * | 4/1996 | Roberts | 359/177 |
| 5,699,468 A | * | 12/1997 | Farries et al. | 385/140 |
| 5,703,975 A | * | 12/1997 | Miller et al. | 385/16 |
| 6,160,931 A | * | 12/2000 | Asakura | 385/24 |
| 6,321,000 B1 | * | 11/2001 | King | 385/24 |
| 6,344,914 B1 | * | 2/2002 | Shimojoh et al. | 359/177 |

OTHER PUBLICATIONS

Oda et al., "128 channel, 480 km FSK–DD transmission experiment using 0.98 micro–meter pumped erbium–doped fibre amplifiers and a tunable gain equaliser", Electronics Letters, vol. 30, No. 12, (June 9, 1994), pp. 982–984.*

Newton's Telecom Dictionary (15th Edition) Feb. 1999, ISBN 1–57820–031–8, Publisher: Miller Freeman Inc., New York, P. 293.

* cited by examiner

Primary Examiner—Mark A. Robinson
Assistant Examiner—Alessandro Amari
(74) Attorney, Agent, or Firm—Barnes & Thornburg

(57) ABSTRACT

An optical equaliser, for use in an optical communications system, comprises a plurality of concatenated, fixed modulation depth, periodic filters. Each of the filters may be individually dynamically wavelength tuned in order to optimise optical equalisation of an optical signal transmitted by an optical element in the optical communications system.

20 Claims, 4 Drawing Sheets

EFFECT OF SIMPLE TWO ARM MACH ZEHNDER INTERFEROMETER

OPTICAL EQUALIZER

This invention relates to the equalisation of optical signals in an optical communications system and in particular but not exclusively to the equalisation of wavelength division multiplexed optical signals.

BACKGROUND TO THE INVENTION

The control of optical power levels in optical communications systems is critical in obtaining optimum performance since the power level of each and every. channel should be sufficient to establish a signal to noise ratio which will provide an acceptable bit error rate, without the power level exceeding a level at which limiting factors such as the onset of non-linear effects result in degradation of the signal. In wavelength division multiplexed (WDM) transmission, it is desirable to maintain the same BER/SNR for each channel, which usually means maintaining each of the power levels of the individual wavelength components at substantially the same level. U.S. Pat. No. 5,513,029 discloses a method of monitoring component power levels in WDM transmission using orthogonal low frequency dither signals and controlling component signal power to maintain optimum performance.

It is also known from GB2314714A that an imbalance of component signal powers in a WDM transmission is likely to occur at an optical amplifier stage, as used to boost signal power at stages in a long distance transmission, utilising optical amplifiers such as erbium doped fibre amplifiers. Such amplifiers have a non-uniform gain characteristic as a function of wavelength which is variable in dependence on the amplifier gain, this change in gain characteristic consequent on change of gain being commonly referred to as dynamic gain tilt.

There is therefore a need to provide optical filtering which is adaptive and which can be used in conjunction with optical amplifiers, or otherwise, in order to maintain a preferred spectral profile of an optical signal.

It is known from Huang et al, IEEE Photonics Technology Letters, Sep. 1996 pp 1243–1245, to provide an acousto-optic tunable filter for dynamic equalisation of channel powers. A disadvantage of such a method is that the filters suffer from polarisation sensitivity and severe channel cross talk.

It is also known from Gobel et al, IEEE Photonics Technology Letters, Mar. 1996, pp 446 to 448, to provide a WDM power level compensator in which demultiplexed channels are subject to power control in respective erbium doped waveguides. A disadvantage of this arrangement is that significant distortion of the modulated optical signal occurs.

It is also known from Madsen et al, IEEE Journal of Lightwave Technology, Mar. 1996, pp 437 to 447, to provide fixed (non-adaptive) filters using a sequence of concatenated Mach-Zehnder interferometers in a planar waveguide structure. Such structures require lengths which are difficult to fit onto a single planar waveguide structure and which have an inherent high insertion loss.

Parallel structures on planar waveguides are known from Dragone, IEEE Photonics Technology Letters, September 1991, pp 812 to 815, which provide non-adaptive filtering with an output at a single wavelength.

It is also disclosed by S. Day in co-pending application U.S. Pat. No. 08/997,752 to provide a variable optical attenuator by means of localised heating of a waveguide.

Yamada et al, Electron Letters 1995, 31, pp 360 to 361, discloses a multiplexer using planar waveguide technology and in which a waveguide array is provided with heating strips for each waveguide in order to compensate for phase errors occurring during fabrication. After such compensation, light components passing through the arrayed waveguides are delayed by respective amounts which differ by a constant phase difference between adjacent waveguides to that recombination in a star coupler at the output of the waveguides is dispersive in wavelength to provide separation of the WDM channels, this arrangement thereby being termed an arrayed waveguide grating.

There is also a further problem that in all of these prior art situations a knowledge of the gain profile of the amplifier to be equalised is required. Thereafter, one or other method of attempting to equalise the gain in the amplifier for different input wavelengths is applied to the output of the amplifier. However, the gain profile is not static and as it changes, for example as the amplifier warms or if a channel is dropped in a WDM system, then the effectiveness of the prior art equalisation techniques is altered. Also, these devices also require the use of a channel monitoring device which generally costs more than the equalisation device.

Therefore, there remains a need to provide an improved yet structurally simple optical equaliser, particularly for use in the context of correcting gain tilt in optical amplification stages of a communications system.

SUMMARY OF THE INVENTION

It is an object of the present invention to provide optical equalisation to, at least partially, compensate for the effects of gain tilt in optical amplifiers.

It is a further object of the present invention to provide an adaptive optical equaliser using planar waveguide technology, the operation of which is technically simple in comparison with prior art optical equalisers.

According to a first aspect of the present invention there is disclosed an optical equaliser, for use in an optical communications system, comprising a plurality of concatenated, fixed modulation depth, periodic filters each of which may be individually dynamically wavelength tuned in order to optimise optical equalisation of an optical signal transmitted by an optical element in the optical communications system.

Preferably, each periodic filter has a fixed period with frequency.

Most preferably, each periodic filter comprises a gain control means, comprising a means for measuring the power output of said element of the optical communications system for a given filter wavelength, and means of tuning the filter wavelength in order to minimise output power.

Preferably, the means of tuning the wavelength of each filter is an analogue dither generator.

Preferably, individual filters are grouped into sets of filters of substantially equal modulation depth.

Preferably, each filter within a set has a different fixed period with frequency.

Preferably, the equaliser comprises three sets of three filters arranged in series, the first set of filters having a modulation depth of 4 dB, the next set of filters having a modulation depth of 2 dB and the next set of filters having a modulation depth of 1 dB.

Preferably, each periodic filter is a two arm Mach-Zehnder interferometer.

According to a second aspect of the present invention there is provided a method of optical equalisation of an optical signal, for use in an optical communications system, comprising the steps of:

filtering the optical signal transmitted by said optical element in the optical communications system through a plurality of concatenated, fixed modulation depth, periodic filters; and dynamically wavelength tuning each of said filter in order to optimise optical equalisation of said optical signal.

According to a third aspect of the present invention there is provided an optical amplifier including an amplifying element and an optical equaliser comprising a plurality of concatenated, fixed modulation depth, periodic filters each of which may be dynamically wavelength tuned in order to optimise the optical equalisation of an optical signal transmitted by said amplifying element.

According to a fourth aspect of the present invention there is provided an optical communications system including an optical equaliser comprising a plurality of concatenated, fixed modulation depth, periodic filters each of which may be individually dynamically wavelength tuned in order to optimise optical equalisation of an optical signal transmitted by an optical element in the optical communications system.

It is an advantage of the present invention that optical equalisation is controlled through adjustment of a single variable (namely, wavelength) for each filter and can be achieved with simple analogue dither techniques local to each periodic filter. Therefore, there is no requirement to monitor channel positions or perform Fourier transforms to provide a complex drive signal for the filters.

Thus, each filter in an equaliser in accordance with the present invention will be much simpler than those in prior art equalisers because the optimisation process is local to each filter and performed on only a single parameter, i.e. wavelength.

Preferred embodiments of the present invention will now be described by way of example only.

Figure 1:
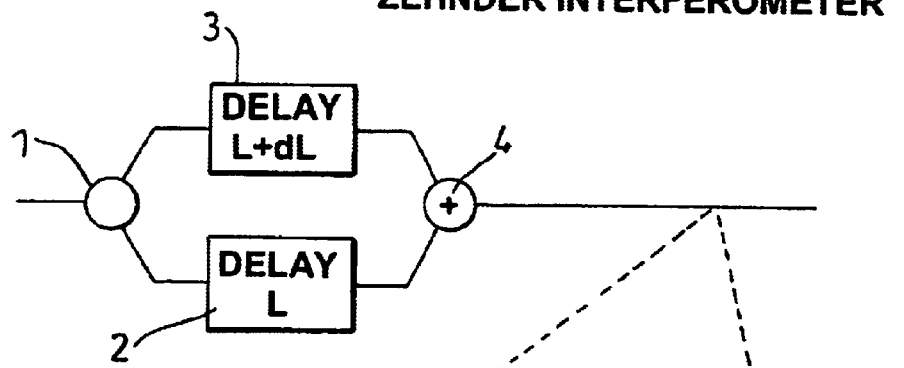
FIG. 1 is a schematic representation of the effect of a two arm Mach Zehnder interferometer.
Figure 1A:
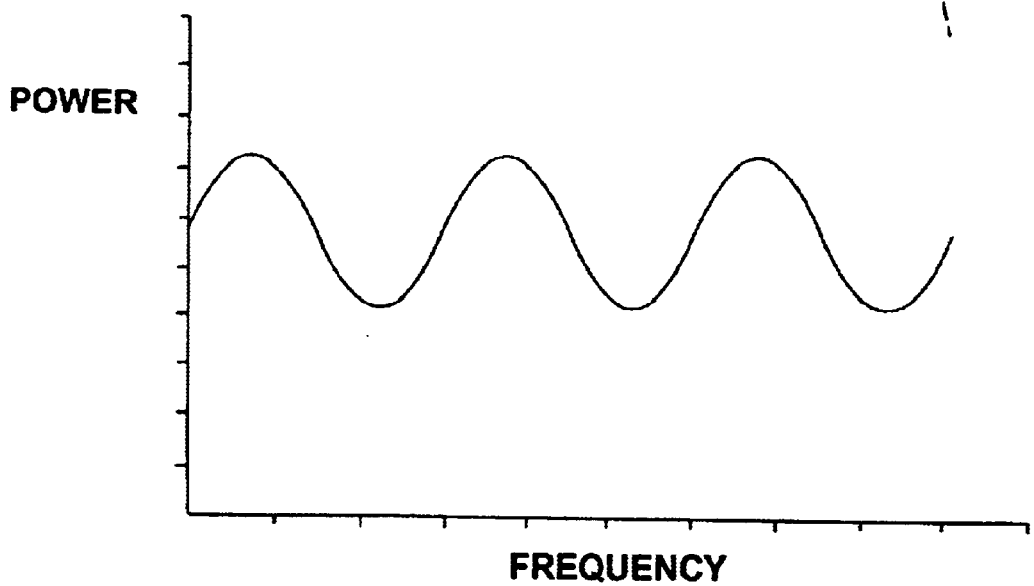

The effect of a simple two arm Mach Zehnder interferometer is illustrated in FIG. 1 in which a splitter 1 divides an incoming signal into first and second portions, the first portion being passed through a delay 2 provided by a length of waveguide L, the remaining portion being passed through a second delay 43 represented by a waveguide of length L+dL, and the outputs from delays 2 and 3 being additionally combined in a combiner 4. The combined output is modulated in frequency space as illustrated graphically in Figure 1a, the modulation being sinusoidal with a period which is inversely proportional to dL.

Figure 2:
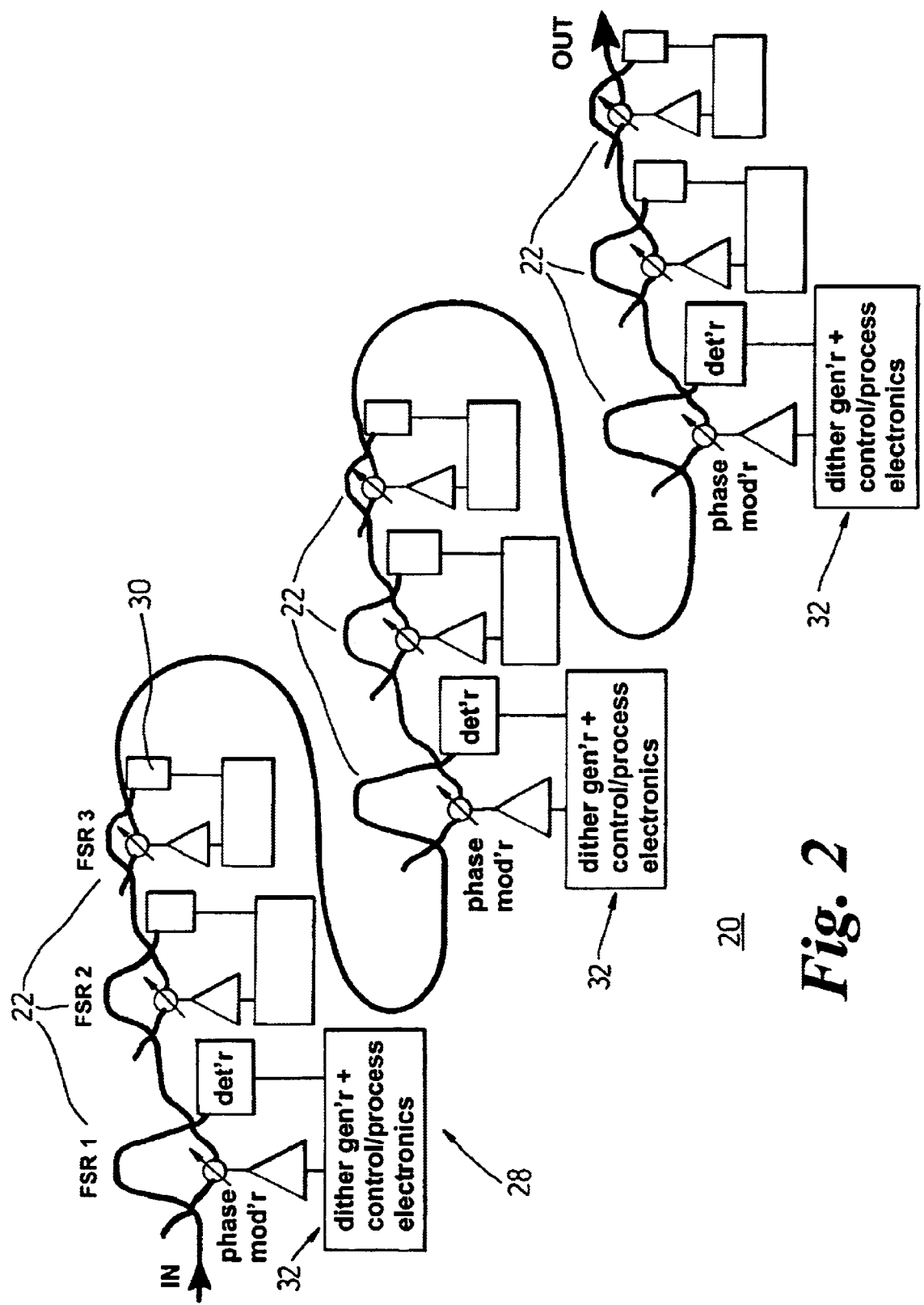
FIG. 2 is a schematic representation of an optical equaliser in accordance with the present invention.
Figure 3:
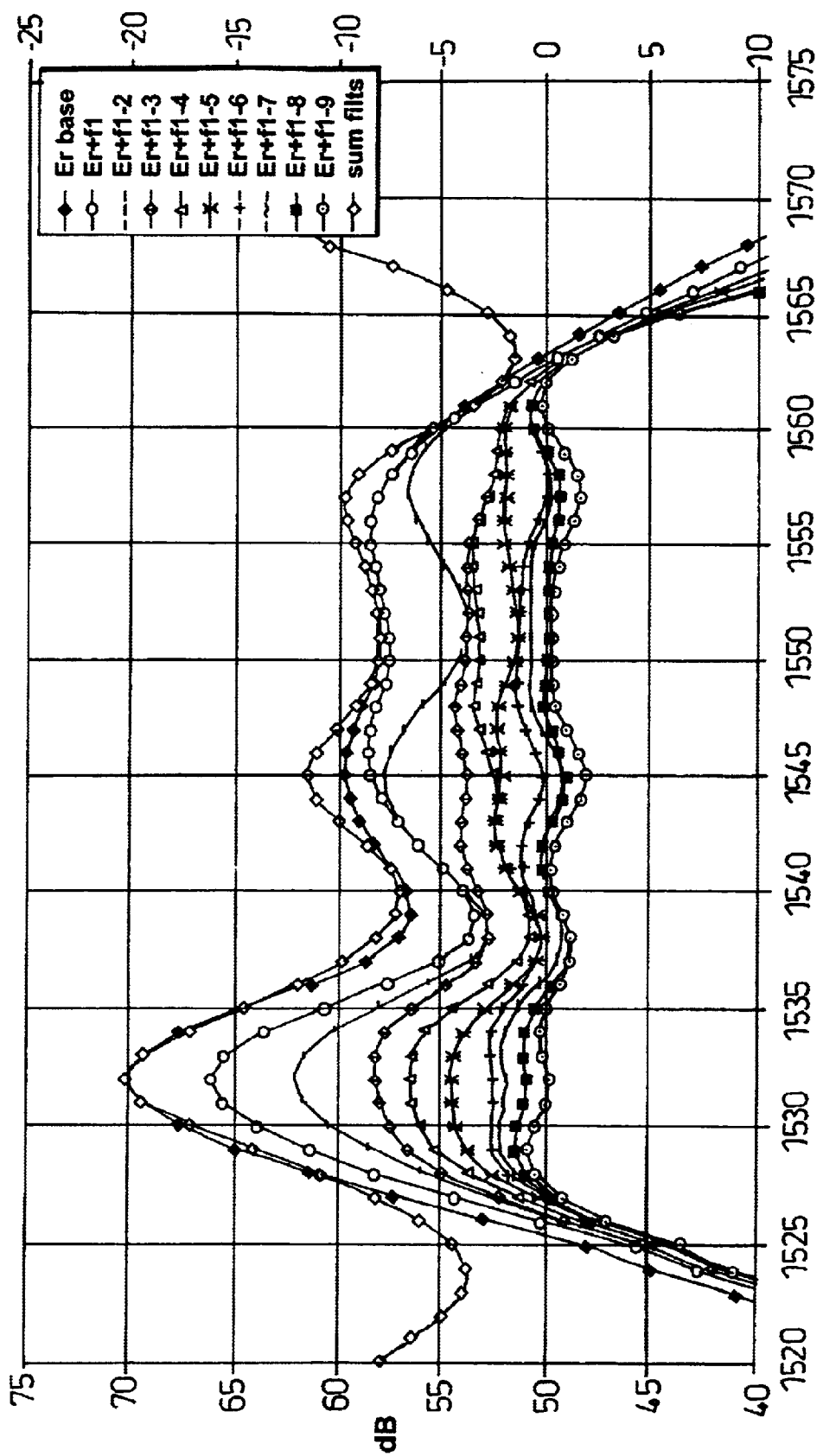
FIG. 3 is a graphic representation of the output of the optical equaliser of FIG. 2.
Figure 5:
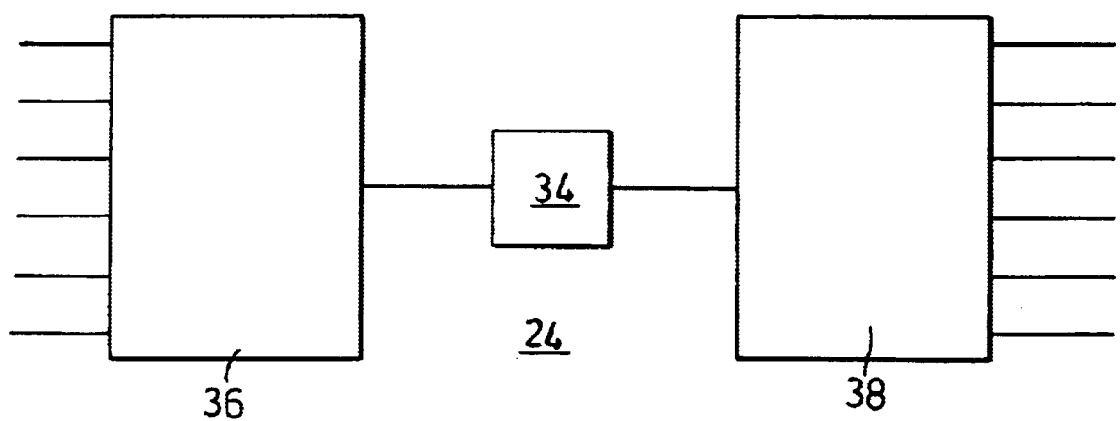
FIG. 5 is a schematic representation of an optical communications system in accordance with the present invention.

FIG. 2 illustrates an optical equaliser 20, for use in an optical communications system 24 (as illustrated in FIG. 5). The equaliser 20 comprises a plurality of concatenated, fixed modulation depth, periodic filters 22. Each of the filters 22 may be individually dynamically wavelength tuned in order to optimise optical equalisation of an optical signal transmitted by an optical element, such as an amplifying element 26, in the optical communications system 24.

Each periodic filter 22 has a fixed period with frequency and comprises a gain control means 28. The control means 28 comprises a detector 30 for measuring the power output of said element of the optical communications system for a given filter wavelength, and means 32 for tuning the filter wavelength in order to minimise output power.

In this embodiment of the present invention, individual filters are grouped into sets of filters of substantially equal modulation depth, as illustrated in FIG. 2. Three sets of three filters are arranged in series, the first set of filters having a modulation depth of 4 dB, the next set of filters having a modulation depth of 2 dB and the next set of filters having a modulation depth of 1 dB.

Also in this embodiment, the means of tuning the wavelength of each filter is an analogue dither generator.

The dither circuit generates a constant frequency square wave. This is applied as a small modulation on top of a larger bias signal. The second output of the filter 22 in the form of a Mach-Zehnder is monitored (with a photodiode) 30 and a synchronous detector (e.g. a lock-in amplifier) is used to extract the dithered signal. The dither frequency is chosen to not interfere with data transmission. The circuit then decides whether the small step used by the dither generator makes more or less power exit through the second port. The circuit tries to maximise the amount of power dropped through the second port. Therefore, it alters the bias current in the direction that the dither indicates will increase the dropped power. It is analogous to a linear convergence technique as used widely for solving numerical problems.

The dither and bias circuits both act to alter the centre wavelength of the filter. In the implementation using a planar waveguide, then the temperature of the heater will be altered in order to alter the path length difference of the Mach-Zehnder and hence alter the centre wavelength of the filter. In another embodiment (not shown) utilising a mechanical filter, a glass plate is tilted to alter the path length difference.

It should be noted that the path length difference of a Mach-Zehnder decides the periodicity of the filter. When you change the path length difference you are actually changing the periodicity (or free spectral range) of the filter. However since we are only observing a small section of the spectrum (approx. 1530–1570 nm), then the very small changes in periodicity appear as large changes in the centre wavelength of the filter. Therefore, in order to tune the centre wavelength of the filter you are actually changing the period very slightly, fortunately it has been realised by the applicants that the effect is very small.

The power being dropped by the second output port of the Mach-Zehnder is measured by a broad response photodiode. The photodiode responds equally to all the channels.

In more detail, the dither circuit tries to align the peak of the filter attenuation with the highest channel powers, in order to equalise the channel powers. Generally, the response of the photodiode with wavelength will vary as a sinusoid, which is how the dither circuit can always find the best position for the filter.

Figure 4:
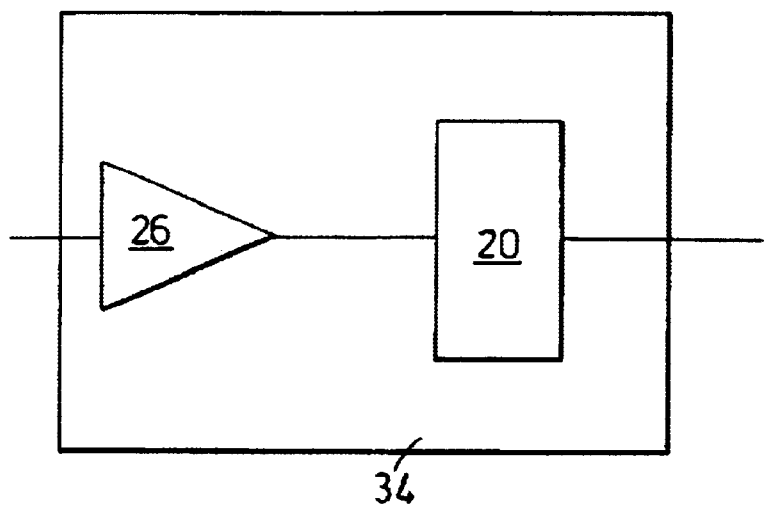
FIG. 4 is a schematic representation of an optical amplifier in accordance with the present invention.

FIG. 4 schematically illustrates an optical amplifier 34 in accordance with the present invention. The amplifier 34 includes an amplifying element 26 and an optical equaliser 20. The equaliser 20 comprises a plurality of concatenated, fixed modulation depth, periodic filters 22 as described above.

FIG. 5 illustrates an optical communications system 24 including an optical equaliser as discussed above. The system 24 also includes a multiplexer 36 and a demultiplexer 38. The multiplexer 36 and demultiplexer 38 are arranged to enable WDM communication. These elements are connected by an optical fibre 40 via an optical amplifier 34 as discussed above.

The foregoing description has been limited to specific embodiment of the invention. It will be apparent to a person skilled in the art, however, that variations and modifications may be made to the invention without departing from the scope or spirit of the present invention as claimed.

What is claimed is:

1. An optical equaliser, for use in an optical communications system, comprising a plurality of concatenated, fixed modulation depth, periodic filters, each having an output which varies periodically with wavelength, each of which is individually dynamically wavelength tunable in order to optimise optical equalisation of an optical signal comprising a plurality of wavelengths transmitted by an optical element in the optical communications system by substantially equalizing optical signal output across the plurality of wavelengths.

2. The optical equaliser of claim 1, wherein each periodic filter has a fixed period with frequency.

3. The optical equaliser of claim 1, wherein each periodic filter comprises a gain control means, comprising a means for measuring the power output of said element of the optical communications system for a given filter wavelength, and means of tuning the filter wavelength in order to minimise output power.

4. The optical equaliser of claim 3, wherein, the means of tuning the wavelength of each filter is an analogue dither generator.

5. The optical equaliser of claim 1, wherein individual filters are grouped into sets of filters of substantially equal modulation depth.

6. The optical equaliser of claim 5, wherein there are three filters per set.

7. The optical equaliser of claim 6, wherein each filter within a set has a different fixed period with frequency.

8. The optical equaliser of claim 5, wherein the equaliser comprises three sets of three filters arranged in series, the first set of filters having a modulation depth of 4 dB, the next set of filters having a modulation depth of 2 dB and the next set of filters having a modulation depth of 1 dB.

9. The optical equaliser of claim 1, wherein each periodic filter is a two arm Mach-Zehnder interferometer.

10. A method of optical equalisation of an optical signal comprising a plurality of wavelengths, for use in an optical communications system, comprising the steps of:

filtering the optical signal transmitted by said optical element in the optical communications system through a plurality of concatenated, fixed modulation depth, periodic filters, each having an output which varies periodically with wavelength; and dynamically wavelength tuning each of said filters in order to optimise optical equalisation of said optical signal by equalizing signal strength across the plurality of wavelengths.

11. The method of claim 10, wherein each periodic filter has a fixed period with frequency.

12. The method of claim 10, wherein each periodic filter comprises a gain control means, comprising a means for measuring the power output of said element of the optical communications system for a given filter wavelength, and means of tuning the filter wavelength in order to minimise output power.

13. The method of claim 12, wherein, the means of tuning the wavelength of each filter is an analogue dither generator.

14. The method of claim 10, wherein individual filters are grouped into sets of filters of substantially equal modulation depth.

15. The method of claim 14, wherein there are three filters per set.

16. The method of claim 15, wherein each filter within a set has a different fixed period with frequency.

17. The method of claim 15, wherein the equaliser comprises three sets of three filters arranged in series, the first set of filters having a modulation depth of 4 dB, the next set of filters having a modulation depth of 2 dB and the next set of filters having a modulation depth of 1 dB.

18. The method of claim 10, wherein each periodic filter is a two arm Mach-Zehnder interferometer.

19. An optical amplifier including an amplifying element and an optical equaliser comprising a plurality of concatenated, fixed modulation depth, periodic filters, each having an output which varies periodically With wavelength, each of which is dynamically wavelength tunable in order to optimise the optical equalisation of an optical signal comprising a plurality of wavelengths and transmitted by said amplifying element by equalizing signal strength across the plurality of wavelengths.

20. An optical communications system including an optical equaliser comprising a plurality of concatenated, fixed modulation depth, periodic filters, each having an output which varies periodically with wavelength, each of which is individually dynamically wavelength tunable in order to optimise optical equalisation of an optical signal transmitted by an optical element in the optical communications system by equalizing signal strength across the plurality of wavelengths.

* * * * *